United States Patent
Galtier

(10) Patent No.: US 6,862,517 B2
(45) Date of Patent: Mar. 1, 2005

(54) METHOD FOR PROCESSING A SENSOR SIGNAL OF A KNOCKING SENSOR FOR AN INTERNAL COMBUSTION ENGINE

(75) Inventor: Frederic Galtier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/341,759

(22) Filed: Jan. 14, 2003

(65) Prior Publication Data

US 2003/0164156 A1 Sep. 4, 2003

(30) Foreign Application Priority Data

Jan. 14, 2002 (DE) .......................................... 102 01 073

(51) Int. Cl.⁷ .............................................. G06F 19/00
(52) U.S. Cl. ..................... 701/111; 73/117.3; 73/35.01; 73/35.04; 73/35.02; 73/35.03; 123/406.16; 123/406.39; 701/101; 701/102
(58) Field of Search ................................ 701/111, 102, 701/101; 123/406.16–406.39; 73/35.01–35.04, 117.3

(56) References Cited

U.S. PATENT DOCUMENTS

| | | | |
|---|---|---|---|
| 4,116,173 A | 9/1978 | McDougal et al. | 123/117 |
| 4,257,373 A | 3/1981 | McDougal et al. | 123/424 |
| 4,471,737 A | 9/1984 | McDougal et al. | 123/425 |
| 4,809,662 A | 3/1989 | McDougal et al. | 123/425 |
| 4,947,680 A | 8/1990 | McDougal | 73/116 |
| 4,960,093 A | 10/1990 | McDougal et al. | 123/416 |
| 4,993,371 A | 2/1991 | McDougal et al. | 123/425 |
| 5,029,567 A | 7/1991 | McDougal et al. | 123/425 |
| 5,085,192 A | 2/1992 | McDougal | 123/417 |
| 5,133,322 A | 7/1992 | McDougal et al. | 123/425 |
| 5,230,316 A * | 7/1993 | Ichihara et al. | 123/406.38 |
| 5,483,936 A * | 1/1996 | Kerstein et al. | 123/406.16 |
| 5,535,722 A * | 7/1996 | Graessley et al. | 123/406.21 |
| 5,608,633 A * | 3/1997 | Okada et al. | 701/111 |
| 6,102,144 A * | 8/2000 | Lutz | 180/65.2 |
| 6,246,952 B1 * | 6/2001 | Honda | 701/111 |
| 6,456,927 B1 * | 9/2002 | Frankowski et al. | 701/111 |

FOREIGN PATENT DOCUMENTS

| | | | |
|---|---|---|---|
| DE | 42 23 649 C2 | 7/1994 | G01L/23/22 |
| DE | 690 05 256 T2 | 7/1994 | G01L/23/22 |
| DE | 691 05 342 T2 | 5/1995 | G01L/23/22 |
| DE | 690 17 063 T2 | 9/1995 | F02P/5/04 |
| DE | 195 20 033 A1 | 12/1996 | G01M/15/00 |
| DE | 100 22 815 A1 | 11/2001 | G01L/23/22 |

OTHER PUBLICATIONS

Signalübertragung, 4. Auflage, 21FF UND 44 FF, Lüke, Springer Lehrbuch (ISBN 3–540–52177–1).

* cited by examiner

*Primary Examiner*—Willis R. Wolfe
*Assistant Examiner*—Johnny H. Hoang
(74) *Attorney, Agent, or Firm*—Baker Botts L.L.P.

(57) ABSTRACT

Method for processing a sensor signal of a knocking sensor for an internal combustion engine, having the following steps: a time window is defined for the evaluation of the sensor signal as a function of the operating state and/or the operating behavior of the internal combustion engine, a plurality of sampled values of the sensor signal are sampled within the predefined time window with a predefined sampling frequency, and an output signal which represents the knocking behavior of the internal combustion engine is determined from the sampled values, the Fourier transform of the sampled values being calculated in order to determine the output signal.

16 Claims, 3 Drawing Sheets

METHOD FOR PROCESSING A SENSOR SIGNAL OF A KNOCKING SENSOR FOR AN INTERNAL COMBUSTION ENGINE

PRIORITY

This application claims foreign priority of the German application DE 10201073.0 filed on Jan. 14, 2002.

BACKGROUND OF THE INVENTION

The invention relates to a method for processing a sensor signal of a knocking sensor for an internal combustion engine.

In internal combustion engines with spark ignition (spark ignition engines), the fuel mixture in the combustion chambers of the internal combustion engine can partially ignite automatically as a result of the compression of the internal combustion engine, which leads to what is referred to as knocking and is manifest, for example, in the form of undesired vibrations.

It is therefore known to monitor the knocking behavior of internal combustion engines with spark ignition so that the engine control can, if appropriate, be counteracted appropriately. For this purpose, it is known to use knocking sensors for example in the form of vibration sensors or pressure sensors which supply a knocking signal whose evaluation allows the knocking behavior of the internal combustion engine to be determined. When the sensor signal is evaluated, only a specific time window of the sensor signal is considered, the position of said time window corresponding to a specific angular position of the crankshaft of the internal combustion engine, the sensor signal containing, within this time window, particularly revealing information on the knocking behavior of the internal combustion engine. The sensor signal which is registered during this time window is then subjected to bandpass filtering, the center frequency of the bandpass filtering being set in such a way that the frequency range of the knocking signal lies within the transmission range of the bandpass filter. The signal energy of the bandpass-filtered knocking signal is then calculated during the predefined time window, which can be done by integrating the squared signal. The knocking signal which is prepared in this way then makes it possible to determine the knocking behavior using the engine electronic system so that the engine electronic system can correspondingly counteract knocking when it occurs.

A disadvantage with the known signal processing method described above is the relatively complicated processing during the bandpass filtering and the calculation of the signal energy. The application of the known signal processing method therefore requires relatively complex hardware and a relatively large amount of computing time.

DE 690 17 063 T2 also discloses a method for evaluating a knocking signal in which the knocking signal is sampled with a predefined sampling rate and subsequently subjected to a Fourier transformation. The sampling rate is set here in accordance with the current state of the engine in order to permit the best possible detection of knocking.

However, a disadvantage with this method is that the relationship between the state of the engine and the resulting sampling rate is permanently predefined in an engine-specific fashion. Without complex adaptations this method is suitable only for a specific type of engine.

In addition, DE 42 23 649 C2, DE 691 05 256 T2, DE 690 05 256 T2, DE 100 22 815 A1 and DE 195 20 033 A1 have disclosed a method and/or device for evaluating or synthesizing knocking signals in which the knocking signal is sampled and subsequently subjected to a Fourier transformation.

However, without complex adaptation these known methods are also only suitable for a certain type of engine.

SUMMARY OF THE INVENTION

The invention is therefore based on the object of improving the known signal processing methods described above in such a way that application is possible in different types of engines without complicated adaptations.

The object can be achieved by a method for processing a sensor signal of a knocking sensor for an internal combustion engine having the following steps:

a time window for evaluating the sensor signal is defined as a function of the operating state and/or the operating behavior of the internal combustion engine, a plurality of sampled values of the sensor signal are sampled within the predefined time window with a predefined sampling frequency, an output signal which represents the knocking behavior of the internal combustion engine is determined from the sampled values, the Fourier transform of the sampled values being calculated in order to determine the output signal, wherein, before a normal operation, the sampling frequency is adapted, in an adjustment procedure, to the frequency range of the knocking signal of the internal combustion engine, and wherein during the setting procedure the output signal is calculated for various values of the sampling frequency and during the normal operation the sampling frequency is set to the value at which the output signal is at a maximum.

The object can be also achieved by a method for processing a sensor signal of a knocking sensor for an internal combustion engine having the following steps:

defining a time window for evaluating the sensor signal, sampling a plurality of sampled values of the sensor signal within the predefined time window with a predefined sampling frequency, calculating the Fourier transform of the sampled values in order to determine an output signal, evaluating the Fourier transform wherein a new sampling frequency is determined according to the evaluated Fourier transform.

In both methods, the real cosine component can be calculated during the calculation of the Fourier transform of the sampled values. During the calculation of the Fourier transform the real cosine component can be read out of a memory in each case in order to simplify and speed up the calculation. The adjustment procedure for the sampling frequency can be repeated at least once during the service life of the internal combustion engine in order to adapt the sampling frequency to a change in frequency of the knocking signal. The adjustment procedure can also be repeated at predefined time intervals or in each case after a predefined number of revolutions of the internal combustion engine. The calculation of the Fourier transform can be carried out in each case for a predefined number of sampled values, independently of the sampling frequency. The sampled values can be combined in groups with the predefined number of sampled values, the Fourier transform being calculated separately for each of the groups. The Fourier transforms which are calculated for the individual groups of sampled values can be added in order to acquire the output signal.

The invention comprises the general technical teaching of calculating the Fourier transform of a sampled signal of the sensor signal instead of the bandpass filtering of the sensor signal and the subsequent complicated calculation of the signal energy, in which case the fact that the Fourier transform of the sampled signal acquired from the sensor signal makes it possible to draw a conclusion about the knocking behavior of the internal combustion engine is exploited.

The sensor signal which is supplied by the knocking sensor is therefore preferably firstly sampled during the time window which contains information, the sampling being carried out with a predefined sampling frequency.

The sampled signal which is acquired from the sensor signal of the knocking sensor is then Fourier-transformed. The Fourier transformation is generally known in telecommunications technology so that it is possible to dispense with a detailed description of the Fourier transformation below. Instead, reference is made to the description of the Fourier transformation in LÜKE: Signalübertragung [signal transmission], fourth edition, Springer-Lehrbuch [instruction manual] (ISBN 3-540-52177-1), page 21 et seq. and 49 et seq., it being possible to attribute the entirety of the present description to the contents disclosed in these references.

These references also demonstrate that in the Fourier transformation a complex component and a real component are to be taken into account, which is relatively costly. In the case of the physical signals which occur here, the complex component of the Fourier transformation can however be ignored so that in the method according to the invention only the real cosine component is preferably taken into account, as a result of which the calculation of the Fourier transform is advantageously simplified to a considerable degree. The Fourier transform X(f) is therefore calculated from the individual sampled values xt according to the following formula:

$$X(f) = \sum_{t=1}^{T} (x_t \cdot \cos(2 \cdot \pi \cdot f \cdot t))$$

The sampled signal which is supplied by the knocking sensor is preferably sampled at equidistant sampling intervals so that the cosine values which occur during the calculation of the Fourier transform can be calculated in advance and stored in a look-up table. This provides the advantage that the Fourier transformation can be calculated by simple addition and multiplication operations, which significantly simplifies the computational effort. In contrast to this, the conventional calculation of cosine values is significantly more complicated.

A further simplification of the signal processing is obtained in a variant of the invention by always carrying out the Fourier transformation independently of the sampling frequency for a predefined number of T sampled values.

If the sampling frequency leads to a relatively large number of sampled values, the individual sampled values are divided up into groups with T sampled values each, in which the case the Fourier transform is calculated for each group of T sampled values in each case.

On the other hand, if the sampling frequency is so small that fewer than T sampled values are acquired, the missing sampled values are preferably filled in with zeros.

In one variant of the invention, there is also provision for the signal processing method to be adapted to the engine-specific knocking behavior of the respective internal combustion engine. It is thus possible, for example, that in the case of four-cylinder engines the knocking signal will lie in a different frequency range than in the case of six-cylinder engines. Correspondingly, it is advantageous that, before the normal operation of the internal combustion engine, the signal processing method according to the invention is adapted to the frequency distribution of the knocking signal of the internal combustion engine within the framework of a preceding adjustment procedure.

For this purpose, the sampling frequency is varied, the output signal for the various sampling frequencies being compared. The signal processing method is then carried out during the normal operation of the internal combustion engine with the sampling frequency at which the output signal was at a maximum. A relatively high-frequency knocking signal will thus generally also require a relatively high sampling frequency, whereas a low-frequency knocking signal will also permit a relatively low sampling frequency.

In a further development, this adjustment procedure is repeated at least once during the service life of the internal combustion engine as the frequency distribution of the knocking signal can change over time. The renewed execution of the adjustment procedure is preferably carried out in each case after predefined adaptation intervals or in each case after a predefined number of revolutions of the crankshaft or camshaft. However, it is also possible to determine the ageing state of the internal combustion engine jointly from a plurality of operating parameters of the internal combustion engine and then to carry out the adjustment procedure again whenever a predefined ageing state has been reached.

BRIEF DESCRIPTION OF THE DRAWINGS

Other advantageous developments of the invention are characterized in the subclaims or will be explained in more detail below together with the description of the preferred exemplary embodiment of the invention with reference to the figures, in which:

DETAILED DESCRIPTION OF THE PREFERRED EMBODIMENTS

Within the scope of the signal processing method according to the invention, firstly the sampling frequency fs is adapted to the knocking behavior of the internal combustion engine in a first step 1 before the normal operation of the internal combustion engine as the frequency distribution of the knocking behavior may, for example, be different in two-cylinder engines than in four-cylinder engines. As a result of such a preceding adjustment procedure before the actual normal operation of the internal combustion engine it is possible to use the signal processing method according to the invention in various types of internal combustion engines without changes. The sequence of the adjustment procedure is explained in more detail in the flowchart illustrated in FIG. 3.

After the optimum sampling frequency fs has been set in step 1, the output signal is calculated from the knocking signal of the knocking sensor in a subsequent step 2, the output signal permitting conclusions to be drawn about the knocking behavior of the internal combustion engine. The sequence of the calculation of the output signal from the knocking signal of the knocking sensor is represented in the flowchart illustrated in FIG. 2 and will be described in more detail.

The output signal which is acquired in this way is then evaluated by the engine control in a subsequent step 3 in order to be able to counteract knocking of the internal combustion engine by means of suitable control measures when it occurs.

During the normal operation of the internal combustion engine, there is a continuous check in a step 4 to determine whether a predefined adaptation interval has expired so as to be able to adapt the sampling frequency fs if appropriate to a changed frequency distribution of the knocking signal. If the predefined adaptation interval has not yet elapsed, the system continues with the normal operation of the internal combustion engine in an infinite loop, the knocking behavior of the internal combustion engine being continuously checked in the way described above.

On the other hand, when the predefined adaptation interval elapses, the system returns to step 1 and the adjustment procedure is repeated by adapting the sampling frequency fs and the frequency distribution of the knocking behavior of the internal combustion engine.

Figure 1:
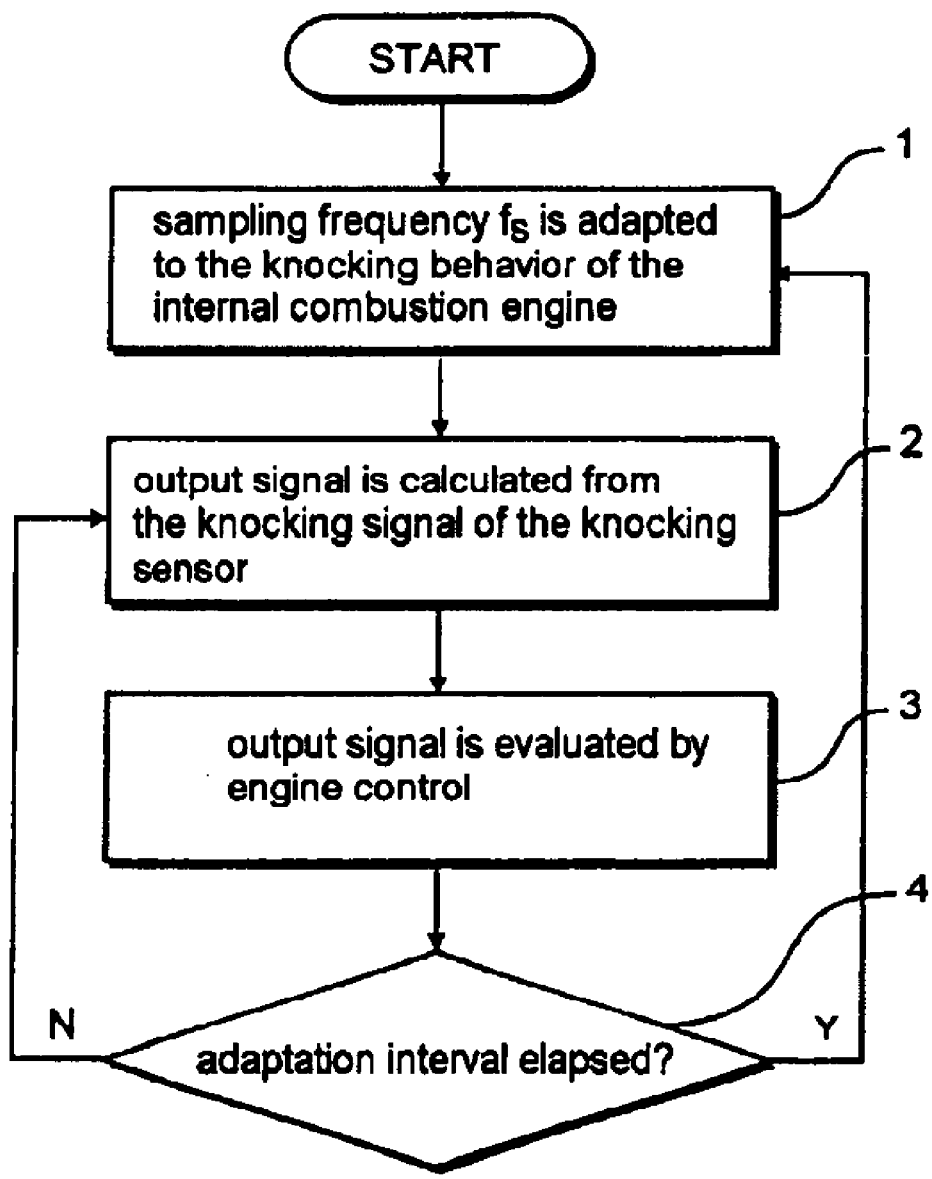
FIG. 1 shows the coarse sequence of the signal processing method according to the invention in the form of a flowchart.
Figure 2:
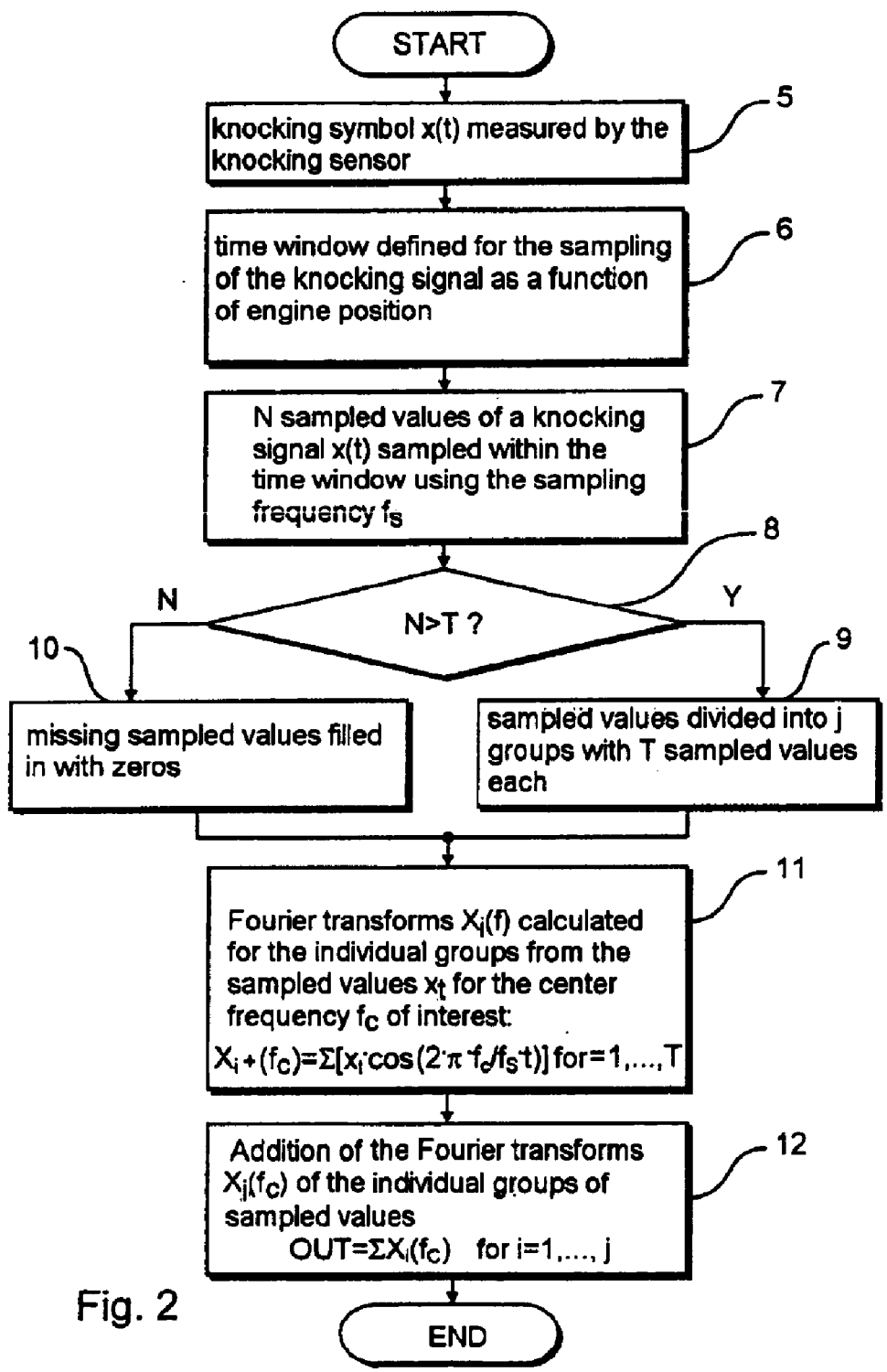
FIG. 2 shows the calculation of the output signal from the knocking signal in the form of a flowchart.

The signal processing method which is illustrated in FIG. 2 will now be described in more detail below.

Here, in a first step 5, a knocking signal x(t) is firstly measured by a knocking sensor, it being possible to use, for example, a vibration sensor or a pressure sensor as knocking sensor. The knocking sensor therefore supplies a knocking signal x(t) which is continuous in terms of time and value.

In a subsequent step 6, the time window of the knocking signal which contains the information permitting conclusions to be drawn about the knocking behavior of the internal combustion engine is then determined. For this purpose, the time window is defined relative to the angular position of the crankshaft, which is known per se and is therefore not described further.

In a subsequent step 7, the knocking signal x(t) which is continuous in terms of time and value is then sampled with a predefined sampling frequency fs within the predefined time window, N sampled values being acquired. The number of sampled values acquired during the step 7 can therefore fluctuate as a function of the sampling frequency fs.

On the other hand, the signal processing method according to the invention is designed for a predefined number of T sampled values, as a result of which the calculation is significantly simplified, as is also apparent from the following description.

For this reason, in a subsequent step 8, checking is carried out to determine whether the number N of the sampled values is greater than the predefined and desired number T of sampled values.

If this is the case, the N sampled values are divided into j groups with T sampled values in each case in a subsequent step 9.

On the other hand, if the sampling frequency fs is so small that the actual number N of sampled values is smaller than the desired number T of sampled values, the missing sampled values are filled in with zeros in a step 10. Subsequently, in a step 11 the Fourier transform Xi(f) is calculated for the individual groups of sampled values for the center frequency fc of the knocking signal which is of interest in accordance with the formula illustrated in FIG. 2.

In a further step 12, the Fourier transform of the individual groups of sampled values is then added to an output signal OUT which permits conclusions to be drawn about the knocking behavior of the internal combustion engine.

The adaptation of the sampling frequency fs to the frequency distribution of the knocking signal of the internal combustion engine will now be described below with reference to the flowchart illustrated in FIG. 3.

Such an adaptation is appropriate before the actual normal operation of the internal combustion engine in order to be able to use the signal processing method according to the invention with various types of internal combustion engines.

Figure 3:
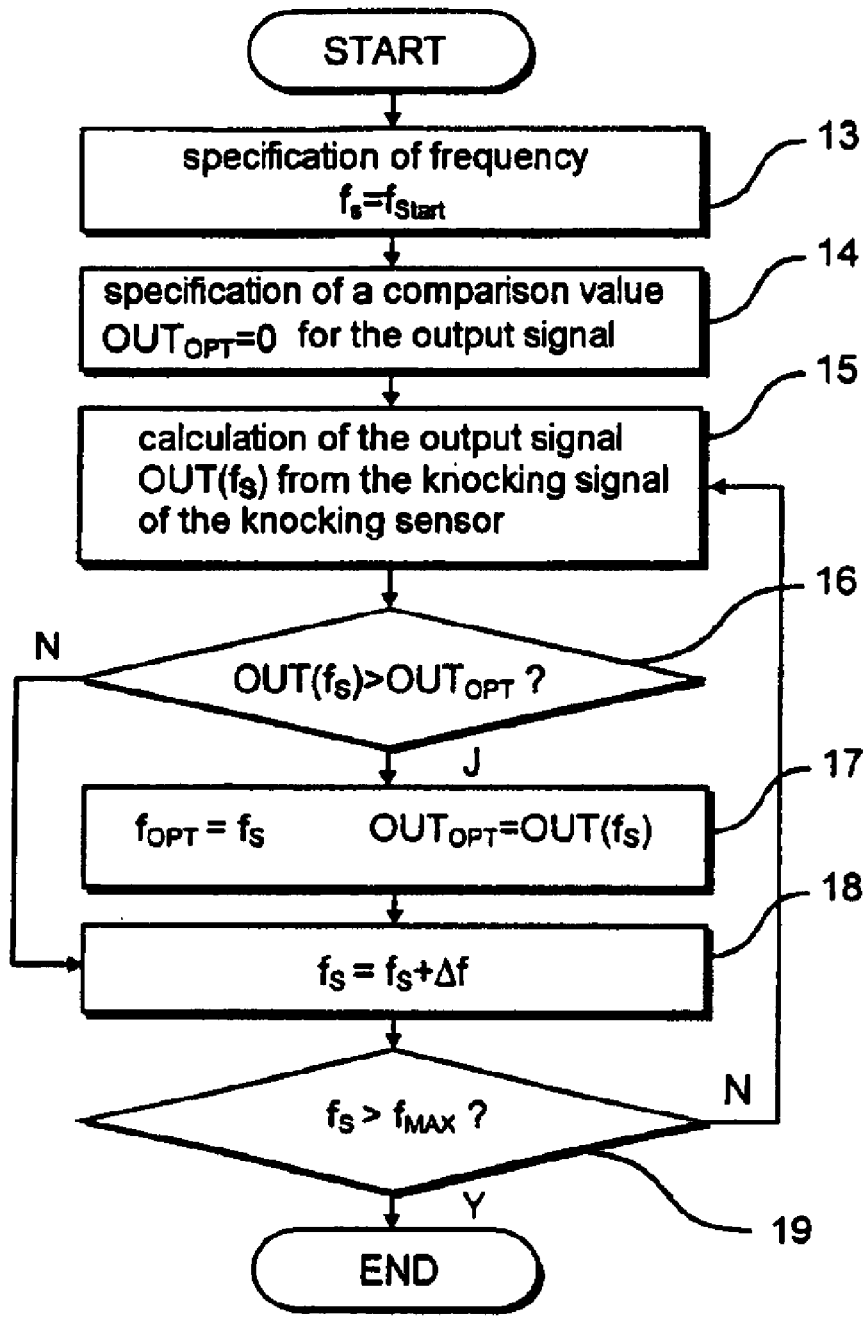
FIG. 3 shows the adaptation of the sampling frequency, also in the form of a flowchart.

Furthermore, the adaptation of the sampling frequency which is illustrated in FIG. 3 makes it possible to adapt the sampling frequency to a frequency distribution of the knocking signal of the internal combustion engine which changes over time.

For this purpose, a specific frequency range for the sampled signal is passed through in order to determine the optimum sampling frequency.

In a first step 13, the sampling frequency is therefore fixed to a starting value fStart which forms the lower limit of the frequency range to be passed through for the sampling frequency.

In a subsequent step, a comparison value OUTOPT=0 is set for the output signal in order to be able to compare the output signals occurring with the various values of the sampling frequency with the comparison value in each case.

In the subsequent step 15, the output signal OUT is then calculated for the respective sampling frequency fs in accordance with the flowchart illustrated in FIG. 2.

In a subsequent step 16, checking is then carried out to determine whether the output signal OUT(fs) which occurs at the respective sampling frequency fs is greater than the predefined, hitherto optimum comparison value OUTOPT. If this is the case, in a subsequent step 17 the current value of the output signal OUT(fs) is used as new comparison value OUTOPT. Furthermore, in such a case the current value fs is accepted as the value fOPT of the sampling frequency which has been optimum until then.

Then, in a step 18 the sampling frequency fs is reduced by a predefined interval in order to be able to repeat the checking described above for the new value of the sampling frequency.

Finally, in a step 19 checking is carried out to determine whether the sampling frequency fS has reached the upper limiting value fMAX of the frequency range to be passed through. If this is not yet the case, the system goes to step 15 and checks whether the next value of the sampling frequency is more suitable. Otherwise, the adjustment or adaptation procedure is terminated and the sampling frequency fOPT is used in the following normal operating mode during the sampling in step 7 in FIG. 2.

The invention is not restricted to the preferred exemplary embodiment of the invention described above. Instead, it is possible to have a multiplicity of variants and refinements which also make use of the inventive idea and therefore fall within the scope of protection.

What is claimed is:

1. A method for processing a sensor signal of a knocking sensor for an internal combustion engine having the following steps:

a time window for evaluating the sensor signal is defined as a function of an operating state and/or an operating behavior of the internal combustion engine, a plurality of sampled values of the sensor signal are sampled within the predefined time window with a predefined sampling frequency, an output signal which represents a knocking behavior of the internal combustion engine is determined from the sampled values, a Fourier transform of the sampled values being calculated in order to determine the output signal, wherein, before a normal operation, the sampling frequency is adapted, in an adjustment procedure, to a frequency range of a knocking signal of the internal combustion engine, and wherein during a setting procedure the output signal is calculated for various values of the sampling frequency and during the normal operation the sampling frequency is set to the value at which the output signal is at a maximum.

2. The method as claimed in claim 1, wherein only the real cosine component is calculated during the calculation of the Fourier transform of the sampled values.

3. The method as claimed in claim 2, wherein during the calculation of the Fourier transform the real cosine component is read out of a memory in each case in order to simplify and speed up the calculation.

4. The method as claimed in claim 1, wherein the adjustment procedure for the sampling frequency is repeated at least once during the service life of the internal combustion engine in order to adapt the sampling frequency to a change in frequency of the knocking signal.

5. The method as claimed in claim 4, wherein the adjustment procedure is repeated at predefined time intervals or in each case after a predefined number of revolutions of the internal combustion engine.

6. The method as claimed in claim 1, wherein the calculation of the Fourier transform is carried out in each case for a predefined number of sampled values, independently of the sampling frequency.

7. The method as claimed in claim 6, wherein the sampled values are combined in groups with the predefined number of sampled values, the Fourier transform being calculated separately for each of the groups.

8. The method as claimed in claim 7, wherein the Fourier transforms which are calculated for the individual groups of sampled values are added in order to acquire the output signal.

9. A method for processing a sensor signal of a knocking sensor for an internal combustion engine having the following steps:

defining a time window for evaluating the sensor signal, sampling a plurality of sampled values of the sensor signal within the predefined time window with a predefined sampling frequency, calculating a Fourier transform of the sampled values in order to determine an output signal, evaluating the Fourier transform wherein a new sampling frequency is determined according to the evaluated Fourier transform.

10. The method as claimed in claim 9, wherein only the real cosine component is calculated during the calculation of the Fourier transform of the sampled values.

11. The method as claimed in claim 10, wherein during the calculation of the Fourier transform the real cosine component is read out of a memory in each case in order to simplify and speed up the calculation.

12. The method as claimed in claim 9, wherein an adjustment procedure for the sampling frequency is repeated at least once during an service life of the internal combustion engine in order to adapt the sampling frequency to a change in frequency of the knocking signal.

13. The method as claimed in claim 12, wherein the adjustment procedure is repeated at predefined time intervals or in each case after a predefined number of revolutions of the internal combustion engine.

14. The method as claimed in claim 9, wherein the calculation of the Fourier transform is carried out in each case for a predefined number of sampled values, independently of the sampling frequency.

15. The method as claimed in claim 14, wherein the sampled values are combined in groups with the predefined number of sampled values, the Fourier transform being calculated separately for each of the groups.

16. The method as claimed in claim 15, wherein the Fourier transforms which are calculated for the individual groups of sampled values are added in order to acquire the output signal.

* * * * *